US008622794B2

(12) United States Patent
Hong

(10) Patent No.: US 8,622,794 B2
(45) Date of Patent: Jan. 7, 2014

(54) NETWORK DART GAME SYSTEM FOR COMPETITION PARTICIPATION AND METHOD THEREOF

(75) Inventor: Sang Uk Hong, Seoul (KR)

(73) Assignee: Hong International Corp., Seoul (KR)

( * ) Notice: Subject to any disclaimer, the term of this patent is extended or adjusted under 35 U.S.C. 154(b) by 77 days.

(21) Appl. No.: 13/392,209

(22) PCT Filed: Aug. 25, 2010

(86) PCT No.: PCT/KR2010/005680
§ 371 (c)(1),
(2), (4) Date: Jun. 4, 2012

(87) PCT Pub. No.: WO2011/025249
PCT Pub. Date: Mar. 3, 2011

(65) Prior Publication Data
US 2012/0258788 A1 Oct. 11, 2012

(30) Foreign Application Priority Data

Aug. 25, 2009 (KR) .................. 10-2009-0078628

(51) Int. Cl.
*A63F 13/00* (2006.01)
(52) U.S. Cl.
USPC .......... 463/7; 463/1; 463/25; 463/36; 463/52; 463/53; 463/54; 273/348; 273/371
(58) Field of Classification Search
USPC ............... 273/371, 348; 463/25, 42, 1, 7, 36, 463/52–54; 473/578
See application file for complete search history.

(56) References Cited

U.S. PATENT DOCUMENTS 7,798,901 B2* 9/2010 Nguyen et al. .................. 463/29
7,857,317 B2* 12/2010 Noda et al. ..................... 273/372
8,241,110 B2* 8/2012 Katz et al. ........................ 463/25
(Continued)

FOREIGN PATENT DOCUMENTS

| JP | 2006-280527 | | 10/2006 |
|---|---|---|---|
| JP | 2007-502658 | A | 2/2007 |
| KR | 10-1997-0705734 | A | 10/1997 |
| KR | 10-2007-0062658 | A | 6/2007 |

OTHER PUBLICATIONS
International Search Report for International Application No. PCT/KR2010/005680 mailed Apr. 21, 2011.

(Continued)

*Primary Examiner* — Sunit Pandya
(74) *Attorney, Agent, or Firm* — Lowe Hauptman & Ham, LLP

(57) ABSTRACT

An apparatus and method for an electronic dart game using an internet communication network, which notifies users of various competitions and provides a method of participating in the various competitions using a plurality of electronic dart game apparatuses connected to an internet communication network without a separate homepage. A method of participating in a competition using a plurality of dart game apparatuses connected with a server through a network including inputting information on players who desire to participate in a competition and information on a competition in which players desire to participate, by using a dart game apparatus; transmitting information including player information and competition information to the server by the dart game apparatus; processing payment by registering that a competition entry fee corresponding to the competition information is paid, by the server; and registering a player as a player participating in the competition, by the server.

18 Claims, 9 Drawing Sheets

(56) References Cited

U.S. PATENT DOCUMENTS

| | | | |
|---|---|---|---|
| 2004/0132530 A1* | 7/2004 | Rutanen et al. | 463/42 |
| 2005/0043088 A1* | 2/2005 | Nguyen et al. | 463/29 |
| 2005/0121855 A1* | 6/2005 | Noda et al. | 273/348 |
| 2006/0281555 A1* | 12/2006 | Kellerman et al. | 463/42 |

OTHER PUBLICATIONS

Korean Office Action for Patent Application No. 10-2009-0078628 dated Jan. 17, 2011.

* cited by examiner

NETWORK DART GAME SYSTEM FOR COMPETITION PARTICIPATION AND METHOD THEREOF

This application is a U.S. National Phase Application of PCT International Application No. PCT/KR2010/005680, filed Aug. 25, 2010. The contents of this application are incorporated herein by reference.

FIELD OF THE INVENTION

The present invention relates to an apparatus and a method for an electronic dart game using an Internet communication network, and more particularly to an apparatus and a method for an electronic dart game using an internet communication network, which can notify users of various competitions and provide a method of participating in the various competitions by using a plurality of electronic dart game apparatuses directly connected to the internet communication network without a separate means such as a homepage.

DESCRIPTION OF THE PRIOR ART

In general, a dart refers to a small arrow and a dart game corresponds to a game in which a user throws darts at a circular target having numbers and obtains scores. The dart game has an advantage in that someone with only arrow shaped darts and a dart target can enjoy the dart game any time and anywhere in all seasons.

A conventional dart board is made of timber or pulp. In the dart game, users throw the arrow shaped darts at a target made of cork or wood materials and earn scores according to the positions of the darts, which determines a winner.

Recently, the dart game has been growing as a worldwide leisure activity due to the development of various ways the dart game proceeds and the arrangement of scoring methods, so that anyone can conveniently enjoy the dart game without distinction of sex or age. The darts have various weights and one dart weighs 18 g to 30 g. The dart consists of a pointy and sharp point (tip) made of a metal material, a barrel (grip), a shaft (bar), and a flight (wing).

The dart target made of wood materials is divided into 20 areas having fan-like shapes and the 20 areas are allocated scores of 1 to 20 points. The points are arranged such that a lower point score is located next to a higher point score in order to allow a user to obtain points only when the user accurately hits a number. Also, the dart target is divided into a single area (the number of the area hit by the user equals the points gained), a double area (double the a number of the area hit by the user equals the points gained), a triple area (triple the number of the area hit by the user equals the points gained), a single bull area (an outer area of a central circle, the value generally being 25 points), and a double bull area (an inner area of the central circle, the value generally being 50 points), in concentric circles from the outside to the inside of the dart target.

In order to keep pace with the popularization of such dart game, competitions participated in by many players are often held beyond simple dart games.

Up to now, when a dart game competition is held, players first register in the competition through the internet and then have preliminary games in a shop holding the competition.

Specifically, a host holding the competition notifies of the competition through a homepage. In most cases, the finals are generally held at one time in a particular venue, in which dozens to hundreds of dart game apparatuses are installed but preliminary rounds are held in various shops having conventional dart game apparatuses. Accordingly, after the competition is notified, locations of the shops in which players can participate in the preliminary rounds and times and dates of the preliminary rounds are notified.

After such a competition is notified, the player fills out a participation application for the competition in which the player desires to participate and pays an entry fee. In this event, the player fills out the participation application on a homepage and then goes to a bank to remit the entry fee or directly goes to the competition venue to pay the entry fee. After the registration in the competition, the player goes to a designated location to participate in the competition according to the notice. Next, the player continuously plays the game during the competition period.

Then, the player enters the homepage again and enters his/her scores obtained during the game. Further, the player can identify whether the player has reached the finals through the homepage. If his/her name is included in the list of finalists, the player may participate in the finals according to the notice in the homepage.

Accordingly, a player who desires to participate in the competition should actively search for information on the competition through a homepage, register for the competition through the internet, go to the bank to pay the competition entry fee, and then visit the shop at which the player can participate in the competition to play the game. As such, the process is very cumbersome for the player. Therefore, except for active players, general players occasionally playing the game for fun after simply seeing the dart game apparatus in a shop usually do not participate in competitions.

SUMMARY OF THE INVENTION

Accordingly, the present invention has been made to solve the above-mentioned problems occurring in the prior art, and an aspect of the present invention provides a method of offering a one-stop service, which can implement functions from competition information search to competition registration and competition participation in a dart game apparatus, so that it is possible to induce players who only desire to occasionally play the dart game after simply seeing the dart game apparatus installed in a shop to participate in the competition as well as active players.

In accordance with an aspect of the present invention, there is provided a method of controlling a plurality of dart game apparatuses connected with a server through a network, the method including inputting information by receiving an input of player information on players who desire to participate in a competition and competition information on a competition in which players desire to participate, by using a dart game apparatus; transmitting information including the player information and the competition information to the server by the dart game apparatus; processing a payment by registering that a competition entry fee corresponding to the competition information is paid, by the server; and registering a player by registering the player information as a player participating in the competition corresponding to the competition information, by the server.

The method may further include extracting a competition for participation by extracting a competition in which the player information has been registered as the player, by the server; receiving a result of a game played by the player from the dart game apparatus, by the server; and storing the received result of the game in association with the extracted competition by the server.

The method may further include calculating a competition ranking by calculating a ranking for each player for the extracted competition, by the server; and transmitting a ranking by transmitting competition ranking information including a ranking corresponding to the player to a portable terminal of the player by using the calculated ranking for each player.

Processing of the payment may include calculating reserved money corresponding to the player by the server; and subtracting reserved money by subtracting from the competition entry fee the calculated reserved money.

Processing of the payment may include extracting a portable terminal number corresponding to the player by the server; transmitting an authentication number to the extracted portable terminal number by the server; inputting an authentication number by receiving an input of the authentication number by the dart game apparatus; and comparing authentication numbers by receiving the input authentication number from the dart game apparatus and comparing the received authentication number with the transmitted authentication number by the server.

Processing of the payment may include inputting cash by receiving an input of cash by the dart game apparatus; and transmitting settlement information containing information on the input cash to the server by the dart game apparatus.

Processing of the payment may include transmitting credit card information to a payment agency by the server; and authenticating a credit card by receiving payment authentication information from the payment agency by the server.

The server may include one or more sets of credit card information corresponding to the player and the credit card information may correspond to information extracted from the credit card information corresponding to the input player information from the server.

The method may further include checking whether the player is eligible to participate in the competition, wherein checking of whether the player is eligible to participate in the competition comprises registering the player only when it is checked that the player is eligible to participate in the competition.

The server may include information on a competition venue corresponding to the competition information and, in checking whether the player is eligible to participate in the competition, the participation may be determined by comparing information on a position where the dart game apparatus is installed and information on the competition venue corresponding to the competition information.

In receiving the input of the player information, the player information may be fetched by the dart game apparatus through a card having the input player information.

In accordance with another aspect of the present invention, there is provided a dart game system including a plurality of dart game apparatuses connected with a server through a network, wherein the dart game apparatus includes an input unit for receiving an input of player information which is information on players who desire to participate in a competition and competition information which is information on competitions in which players desire to participate; a target unit comprising a plurality of scoring areas which darts hit; a sensing unit for detecting the plurality of scoring areas which the darts hit; a network connector for transmitting the player information and the competition information to the server; and a controller for controlling such that the competition information and the player information input through the input unit are transmitted through the network connector, wherein the server includes a payment processor for processing payment for the competition entry fee corresponding to the competition information; and a registration unit for registering the player information as a player who participates in the competition corresponding to the competition information.

The server may further include a participation competition extractor for extracting a competition in which the player information has been registered; a game result receiver for receiving a result of a game played by the player from the dart game apparatus; and a game result storing unit for storing the received result of the game in association with the extracted competition.

The server may further include a competition ranking calculator for calculating a ranking for each player for the extracted competition; and a short text transmitter for transmitting competition ranking information containing a ranking corresponding to the player to a portable terminal of the player based on the calculated ranking for each player.

The payment processor may calculate reserved money corresponding to the player from the server and subtract from the competition entry fee the calculated reserved money.

The payment processor may extract a portable terminal number corresponding to the player from the server, transmit an authentication number to the portable terminal number extracted from the server, receive an authentication number input from the dart game apparatus, and compare the received authentication number with the transmitted authentication number.

The dart game apparatus may further include a coin inserter for allowing coins to be inserted or a bill inserter for allowing bills to be inserted, and the payment processor may receive settlement information containing information on coins or bills input in the dart game apparatus from the dart game apparatus and store the received settlement information.

The input unit may include a button unit including top, bottom, left, and right direction keys, an option button, and a selection button, or an RF-ID (Radio Frequency IDentification) card reader.

As described above, through the utilization of the method of controlling the dart game apparatus according to an embodiment of the present invention, it is possible for players to immediately and easily participate in the competition without any cumbersomeness while enjoying the dart game in a shop and there is an effect of drawing more and more players into the competition by stimulating players' strong desire to win.

Further, a shop having the dart game apparatus has an advantage of inducing customers because the players more often visit the shop to participate in the competition, and a host holding the competition has an advantage of more successfully conducting the competition due to the participation of many more players through an easier participating method.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENT

Hereinafter, an exemplary embodiment of the present invention will be described with reference to the accompanying drawings.

Figure 1:
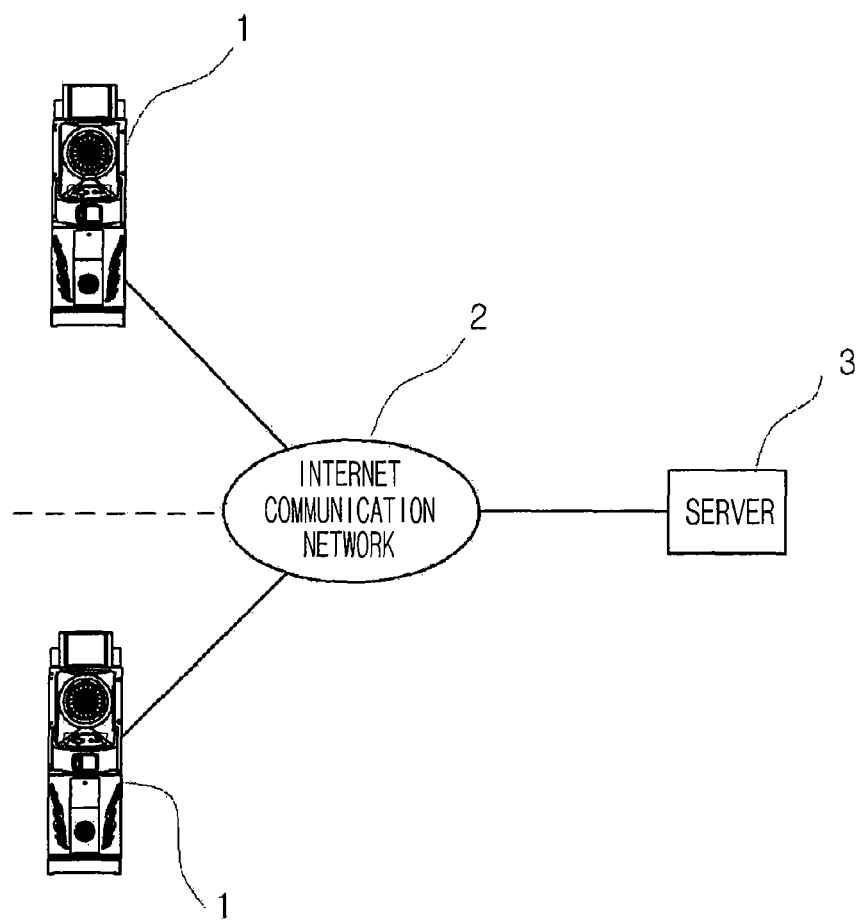
FIG. 1 is a diagram schematically illustrating an electronic dart game apparatus using an internet network according to an embodiment of the present invention.

FIG. 1 is a diagram schematically illustrating an electronic dart game apparatus using an internet network according to an embodiment of the present invention.

As shown in FIG. 1, a plurality of electronic dart game apparatuses 1 according to an embodiment of the present invention are connected through an internet communication network 2 to allow players to enjoy a dart game in different places (shops) or different countries.

Of course, as described above, a plurality of players can enjoy the dart game in different places by using the electronic dart game apparatuses 1 according to the embodiment of the present invention online, but the players also can independently enjoy the dart game in each shop offline.

Further, since the individual electronic dart game apparatus 1 accesses a server 3 through the internet communication network 2, the electronic dart game apparatus 1 can download the latest program for the dart game and check data. Furthermore, the server 3 includes a database to store shop information, personal information on each player, a dart game ranking, a game result of a player, and scores of the player in real time. Here, the server 3 is provided by a manufacturer of the electronic dart game apparatus 1 according to the embodiment of the present invention or an internet company related to the electronic dart game apparatus. Once the electronic dart game apparatus 1 according to the embodiment of the present invention performs an access online (each apparatus has a registered inherent machine ID and a shop purchasing the apparatus also has a registered separate ID and a password), the electronic dart game apparatus 1 is directly connected to the server 3 and can receive all services related to the dart game.

Figure 2:
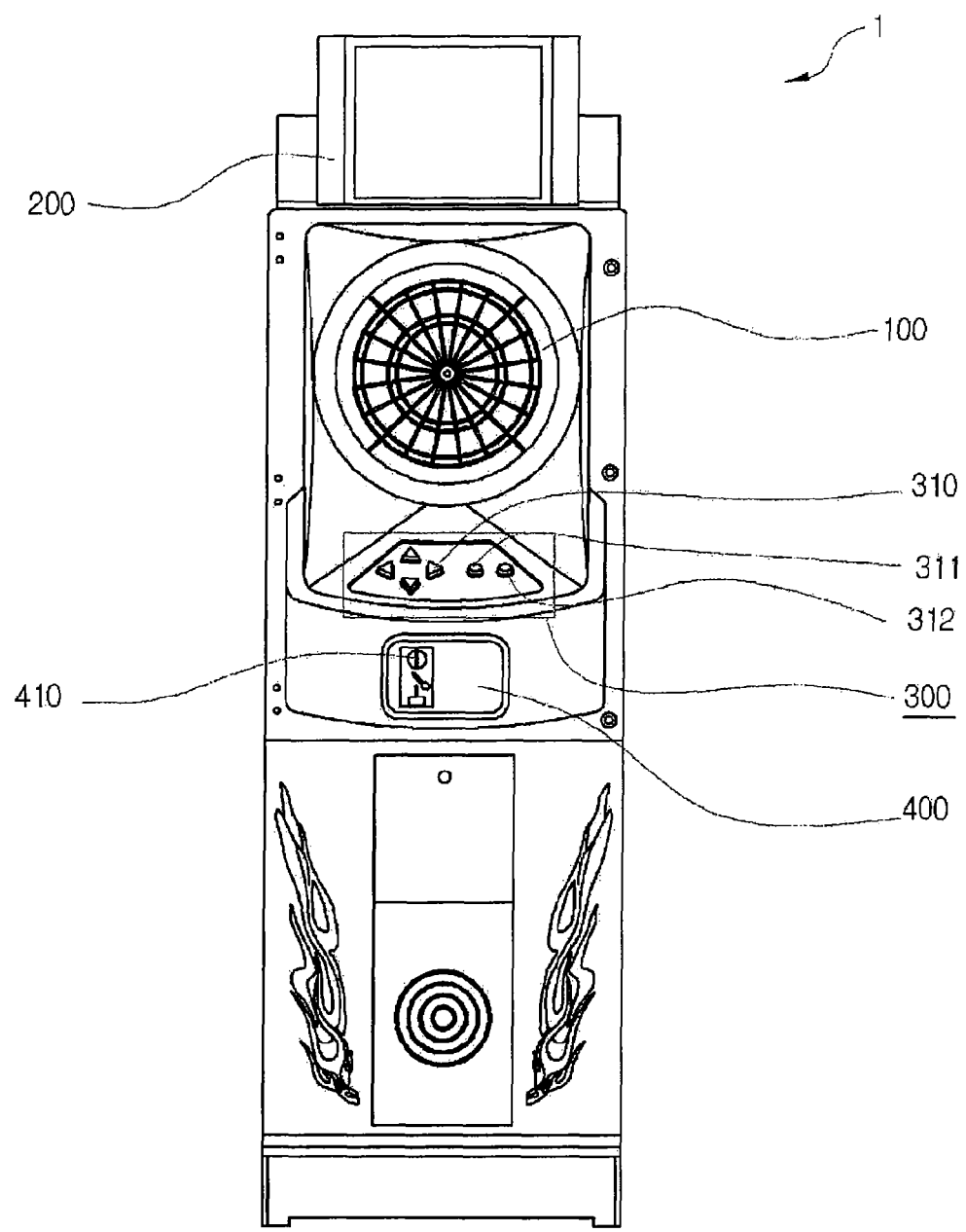
FIG. 2 is a front view of an individual electronic dart game apparatus according to an embodiment of the present invention.
Figure 3:
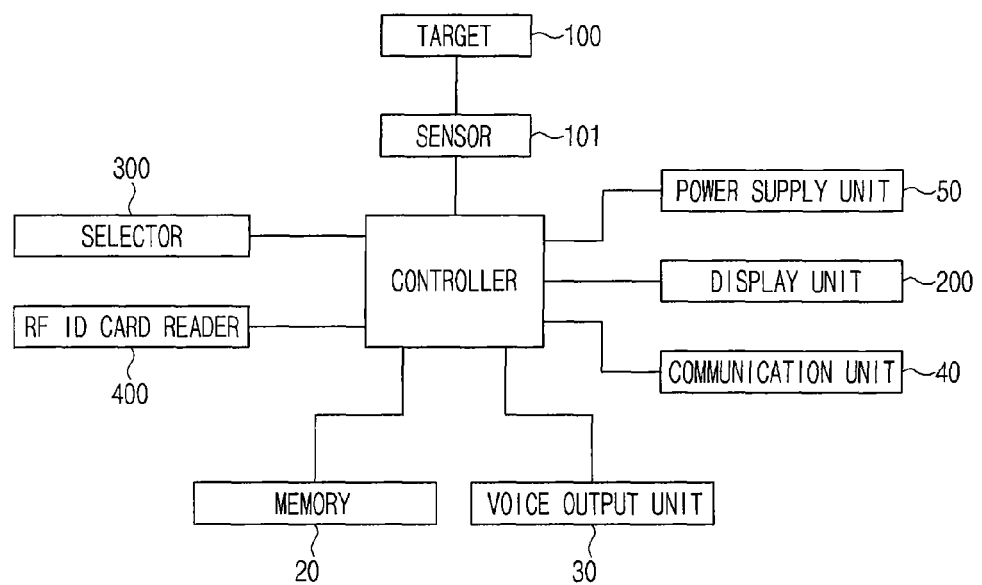
FIG. 3 is a block diagram illustrating a construction of the electronic dart game apparatus of FIG. 2.

FIG. 2 is a front view of an individual electronic dart game apparatus according to an embodiment of the present invention and FIG. 3 is a block diagram illustrating a construction of the electronic dart game apparatus of FIG. 2.

The electronic dart game apparatus 1 includes a selector 300 for selecting a plurality of different dart games according to operations of players, a dart target 100 having a plurality of scoring areas to be hit by darts thrown by the players, a sensor 101 for detecting the plurality of scoring areas hit by the darts, and a controller for grasping a dart game status for an individual player from the dart game selected from the selector 300 and scores detected from the sensor 101 in real time and outputting the grasped dart game status to a display unit 200.

Also, the electronic dart game apparatus 1 further includes a voice outputting unit 30 for outputting voice, a memory 20 for storing various dart game programs or data, a communication unit 40 having a communication interface for the connection with the internet communication network 2, and a power supply unit 50 for applying power. The voice outputting unit is equipped with a woofer system to provide dynamic sounds.

When the electronic dart game apparatus is turned on with power supplied by the power supply unit 50, the display unit 200 automatically displays an image. The display unit 200 displays all corresponding screens involved with the progress of the game, which is from the start to the end of the game, such as a main screen to select game categories, an option button screen, an option selection screen, and a real time dart game status screen. Of course, such a display of the screen is automatically displayed under a control of the controller 10 according to an output from the sensor 101 for sensing scores of the target 100 and the selector 300, which is an input unit. That is, different screens are displayed according to various games selected by the selector 300 and values corresponding to scoring areas of the target 100 hit by the dart thrown by player according to each game are calculated and displayed in real time.

The selector 300, which is the input unit, is installed in a lower part of the target 100 and includes top, bottom, left, and right direction keys 310, an option button, and a selection button 312 as shown in FIG. 2. The selector 300 having the above construction is electrically connected with the display unit 200 and the controller 100.

When the top and bottom keys are pressed in a main screen to select competition categories, a corresponding competition, in which a player desires to participate, may be selected by the selection button 312 while a cursor is moved. When the right key is pressed, a submenu of a corresponding category appears, and, when the left key is pressed, the screen returns to a menu of a previous stage. When the option button 311 is pressed, a help menu of the electronic dart game apparatus 1 according to the embodiment of the present invention appears, and, when the option button is pressed in a game submenu of the category, the help topics for a corresponding menu appear.

The circular dart target 100 has a bull area 101 located in the center of the dart target and the circumferential area is divided into 20 areas in a circumferential direction to form fan shaped areas. The fan shaped areas include four areas in a radial direction, that is, a single line area 103, a triple line area 104, another single line area 105, and a double line area 106 from the center. Of course, an outermost numbered area 107 allocated a plurality of numbers is defined as a foul line (out-of-bounds) area. Further, the bull area 101 includes a double bull area 101-1 and a single bull area 101-2. Furthermore, the numbered area 107 has a number of "20" on the top of the numbered area and has numbers in an order of "5", "12", "9", "14", "11", "8", "16", "7", "19", "3", "17", "2", "15", "10", "6", "13", "4", "18", and "1" in a counterclockwise direction.

In calculating actual scores, for example, obtained scores are calculated as 20 points, 60 points, 20 points, 40 points, and 0, respectively when the darts hit the single line area 103, the triple line area 104, the other single line area 105, the double line area 106, and the foul line area 107 in the fan-like shaped area corresponding to the number "20". Of course, the double bull area 101-1 and the single bull area 101-2 are fixed to 50 points and 25 points, respectively.

Further, when a player throws a dart at the dart target 100, a signal is transferred to the controller 10 and scores are electronically calculated while the dart target is moved and the sensor 101 in the rear senses the dart target. The sensor 101 can play a role of transferring a signal from the target 100 to the controller 10 by using a general matrix sensor and play a role of recognizing that a player has thrown the dart by detecting fouls using a general vibration sensor when the dart hits other areas (foul areas) without hitting predetermined areas of the target 100, but the present invention does not limit types of the sensors.

Further, as shown in FIG. 2, the electronic dart game apparatus 1 according to the embodiment of the present invention further includes an RF-ID (Radio Frequency Identification) card reader 400 and a coin inserter 410 for allowing coins to be inserted, which are installed in the electronic dart game apparatus 1. Here, an RF-ID card system uses a system, which can receive and transmit various data using a regular frequency band in a wireless method, and has recently been widely used for a pass card for collecting fees for a parking lot or subway. The RF-ID card reader 400 can act as an input unit by being brought into contact with the RF-ID card reader 400 and receive transmissions of a ranking, statistics, and a play result of a corresponding player through the memory 20 or the database of the server 3 when the RF-ID card is brought into contact with the RF-ID card reader 400. That is, an authentication procedure to fetch information on each player from the database is performed through the RF-ID card reader, so that the ranking, the statistics, and the play result of the corresponding player may be transmitted. Of course, the ranking, the statistics, and the play result of the corresponding player may be stored in the RF-ID card itself in real time, but the present invention is not limited thereto.

Through an access to a homepage (server) of a manufacturer of the electronic dart game apparatus 1 according to the embodiment of the present invention or an internet company related to the electronic dart game apparatus, an access to a member page may be performed by inputting a card number printed in the back of the card. Through the member page, an access to various data may be simply performed and it is possible to inquire about a ranking, search for clubs, find friends, join a club, send a message, and manage a league. That is, by simply bringing the RF-ID card into contact with the RF-ID card reader 400, an access to the database of the server is automatically performed, and a game result and scores are recorded. Further, it is possible to identify whether a person (player) who is a member of the same club is accessing the server 3 through the internet communication network 2 by using a mobile terminal such as a cellular phone to currently play the game.

Furthermore, although not illustrated in the drawings, the electronic dart game apparatus 1 according to the embodiment of the present invention is equipped with a web camera or a digital camera to photograph a person playing the game in real time and display a game situation through the internet communication network in real time. Of course, it is possible to watch the person playing the game through a mobile phone in real time.

Figure 4:
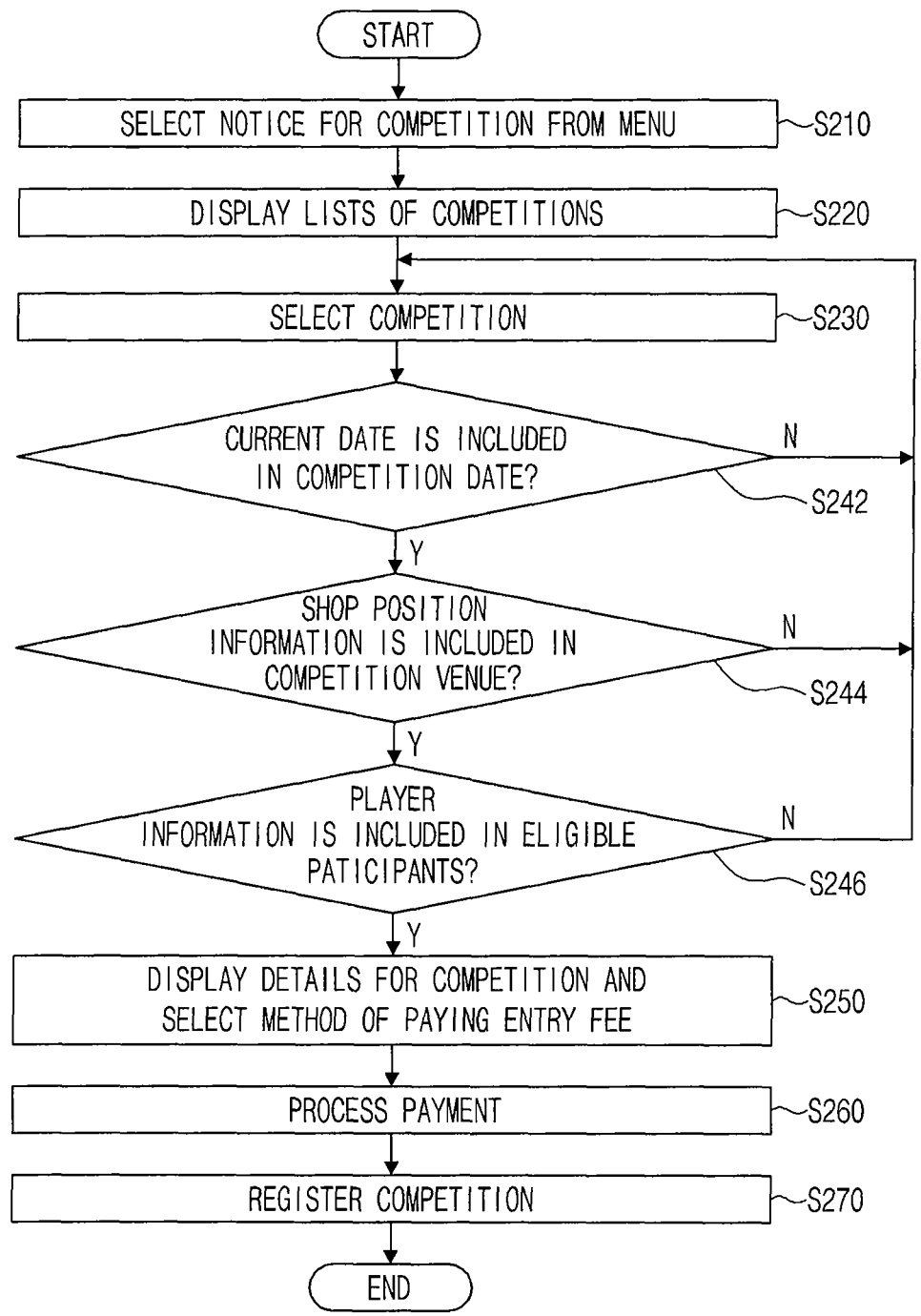
FIG. 4 is a flowchart for describing a method of participating in a competition using a dart game apparatus according to an embodiment of the present invention.

FIG. 4 is a flowchart for describing a method of participating in a competition using a dart game apparatus according to an embodiment of the present invention.

Once the dart game apparatus installed in a shop is started, a menu is displayed in the display unit within the dart game apparatus and an input is received from a player through the selector within the dart game apparatus, and thus a competition is selected from the menu in step S210.

Thereafter, lists of currently ongoing competitions are arranged in the dart game apparatus in step S220. A competition operator or a host holding the competition stores the lists of competitions in the database within the server and can read information on the lists to display it in the dart game apparatus connected with the server through the network.

A selection of one competition among the arranged lists of the competitions is input by a player through the selector in step S230.

The competition information stored in the server largely contains the date and time of the competition, the competition venue, eligible participants, and a competition entry fee.

Next, when a user selects a competition in which the user desires to participate among the arranged lists of competitions, the user determines whether the current date is prior to the competition's date in step S242. If it is past the competition's date (S242-N), a next step is not performed and a message stating "The competition has already concluded" is displayed. Similarly, if the competition has not yet started, it is processed in the same way. Of course, it is possible to set the participation applications to be submitted in advance or separately add a variable, which is an available date to participate in the competition, so that periods within which players can register and periods during which the actual competition is held are different.

Next, it is determined whether the position of the shop having the dart game apparatus to which a user currently provides an input is included in the competition venue in step S244. As described above, each of the dart game apparatuses has a registered inherent machine ID and a shop purchasing the dart game apparatus also has a registered separate ID and a password. Accordingly, the server can determine the position where a corresponding dart game apparatus is installed and thus also can determine whether the corresponding position where the dart game is installed is included in the competition venue. For example, if the place of the competition corresponds to all shops having the dart game apparatus within Seoul and the position where the dart game apparatus to which the player provides an input is installed is Incheon, a next step is not performed and a guide message is displayed.

Next, it is determined whether information on the player satisfies conditions for eligible participants in step S246. As described above, the database in the server stores personal information on each player, a dart game ranking, a game result and scores of the player in real time. Accordingly, it is possible to know a ranking of the player who desires to participate in the competition by receiving an input of an ID through the input unit within the dart game apparatus or receiving the input of the ID through a card having an inherent ID for each player by means of the card reader before the player submits an application for the competition participation. Therefore, if the competition in which the player desires to participate is available only for players having ranks higher than class A, a ranking of the player who desires to participate in the competition is inquired and then a next step is performed only when the conditions are satisfied. When the conditions are not satisfied, the next step is not performed and a guide message is displayed.

Of course, only lists of available competitions can be displayed in step S220 after the date, the venue, and the player information are searched in advance without steps S242, S244, and S246. However, it is preferable to display all of the currently ongoing competitions from a business perspective.

After steps S242, S244, and S246, when it is determined that the player can participate in the competition, the player selects a payment method for the entry fee and receives a guide for detailed contents of the competition in step S250.

In this event, the players should select one of the payment methods, which correspond to a method of subtracting reserved money, a method of paying with a mobile phone, a method of paying with a credit card, and a method of inserting cash, in order to enable the player to directly pay while in front of the dart game apparatus and it will be described with reference to FIG. 5 in more detail.

When the player selects the payment method, a payment process suitable for the corresponding payment method is performed and the payment is processed in step S260.

When the payment has been completed, the corresponding player is registered in the selected competition in step S270.

When the corresponding player is registered in the competition, the player can participate in the competition. For example, when the player goes to a shop included in the competition venue and interacts with the dart game apparatus within the competition periods, a competition participation menu is displayed. Through selecting the corresponding menu, the player can participate in the corresponding competition. The game played while the player participates in the competition is transmitted to the server and recorded as a competition record. The competition record can be used as a reference to select a winner of the competition or the finals (higher competition) from players participating in the competition.

Meanwhile, when the player is registered in the competition, ID card information of the user who desires to participate in the competition, an ID of the dart game apparatus touched by the card, an ID of a shop in which the dart game apparatus is installed, and authentication information of a mobile phone of the user may be registered together. Accordingly, when the user registered in the competition participates in a future competition, if the competition is available in any location, the user can participate in the competition as long as an authentication process through the ID card and the mobile phone of the user is passed.

As described above, it has been described that the registration is possible within the available registration period through checking of the competition period in the competition registration. Similarly, after registering in the competition, the user may have a limitation in participating in the competition since the user should play the game within the corresponding period. At this time, not only is the period limited but also the execution number is limited. That is, the user can participate in the competition only 10 times within the competition period.

When the user can participate in the competition only using the apparatus touched by the user, an ID of the dart game apparatus registered in the competition and an ID of the dart game apparatus touched for the competition participation are compared. Similarly, when the competition is available only in the shop having the apparatus which the user touched, an ID of the shop registered in the competition and an ID of the shop having the apparatus touched for the competition participation are also compared.

Meanwhile, the server frequently records rankings of competition participants during the competition and transmits information on the rankings or records of the competition to a portable terminal of each player whenever the rankings of the competition participants are changed or at particular time points. Accordingly, it is possible to induce a player whose ranking is changed into a lower ranking to visit the shop and play the game by stimulating the players' strong desire to win. Of course, the player does not have to bring the card into contact with the card reader all the time as described above and can sometimes directly input information such as an inherent ID of the user by using the input unit of the dart game apparatus to participate in the competition.

Meanwhile, as described above, it is also possible to show a dynamic image of the game executed by the user other than the rankings or records of the competition. The dart game apparatus has a camera installed therein and the camera can record the dart game played by the user in the form of the dynamic image. The recorded dynamic image is stored in the server. When the dynamic image is stored in the server, an ID card number of the user, a user name, a shop name, an ID of the dart game apparatus are stored together with the dynamic image. The stored dynamic image is sent to the user through an e-mail. Alternatively, the stored dynamic image may be sent to a mobile phone of the user using an MMS.

Figure 5:
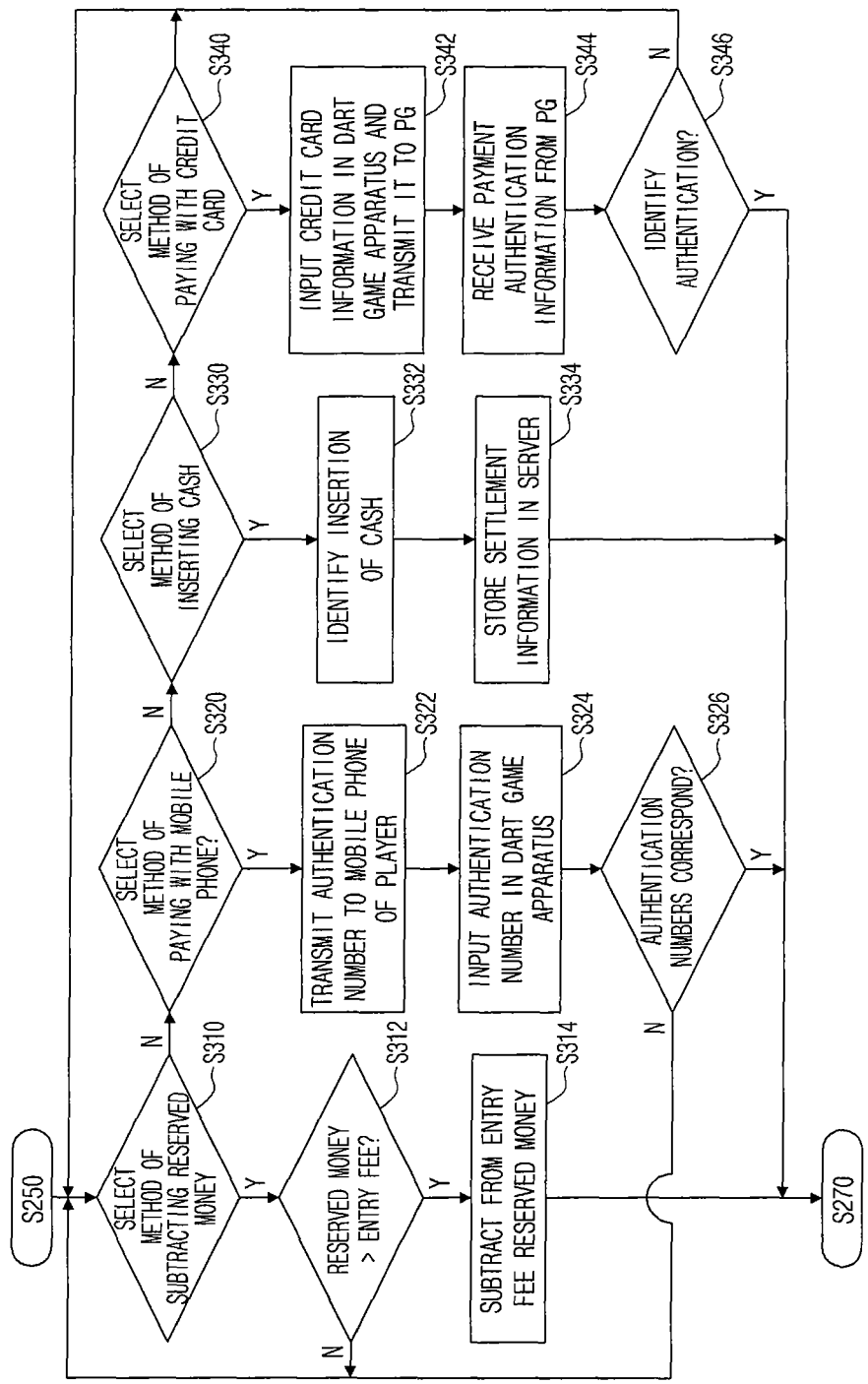
FIG. 5 is a flowchart for describing an entry fee payment process according to an embodiment of the present invention.

FIG. 5 is a flowchart for describing an entry fee payment process according to an embodiment of the present invention.

As described above, the dart game apparatus according to the embodiment of the present invention provides a function of allowing the player to directly participate in the competition by using the dart game apparatus and accordingly the entry fee payment also should be directly conducted using the dart game apparatus.

First, when the user selects the method of subtracting from the entry fee the reserved money as the payment method (S310-Y), it is determined whether the remaining reserved money of the player is larger than the entry fee in S312. The reserved money of the player may be stored in the database within the server of the competition operator or may be stored in a storage medium of a player card carried with the player. When the reserved money stored in a form of electric money is larger than the entry fee, the payment is processed through the method of subtracting from the competition entry fee the reserved money.

When the user selects the method of paying the entry fee with the mobile phone (S320-Y), an authentication number is transmitted to the mobile phone of the player in step S322. As described above, since the server of the competition operator stores personal information on the player, the authentication number can be issued to the mobile phone number of the player. After the transmission of the authentication number, a display screen is displayed to input the authentication number and then the authentication number is input by the player through the selector in step S324. When the input authentication number corresponds to the transmitted authentication number (S326-Y), the payment is complemented and a next step is performed.

When the user selects the method of inserting cash (S330-Y), it is identified whether the player inserts cash into the dart game apparatus in step S332. The dart game apparatus has a coin inserter, which allows coins to be inserted, installed therein. The payment is performed by receiving the coins but it is preferable to further install a bill inserter for convenience. When the insertion of cash has been identified, the information is transmitted to the server. The competition entry fees are not incomes of the shop having the dart game apparatus but are incomes of the competition operator hosting the competition. The cash inserted into the dart game apparatus should be calculated at the predetermined date and time and accordingly the information should be transmitted to the server.

When the user selects the method of paying the entry fee with a credit card as the payment method (S340-Y), credit card information is input by the player and the information is transmitted to a payment agency (PG) in step S342. As described above, since the dart game apparatus has the card reader, the dart game apparatus can read the information by bringing the card into contact with the corresponding card reader, and pre-storing the card information of the player in the server to use the pre-stored card information, or have the player input the card information through the selector.

Next, payment authentication information is received from the payment agency in step S344. When the authentication has been identified (S346-Y), the payment processing is complemented and a next step is performed.

FIGS. 6 to 9 are examples of a menu screen displayed in the display unit of the dart game apparatus according to an embodiment of the present invention.

Figure 6:
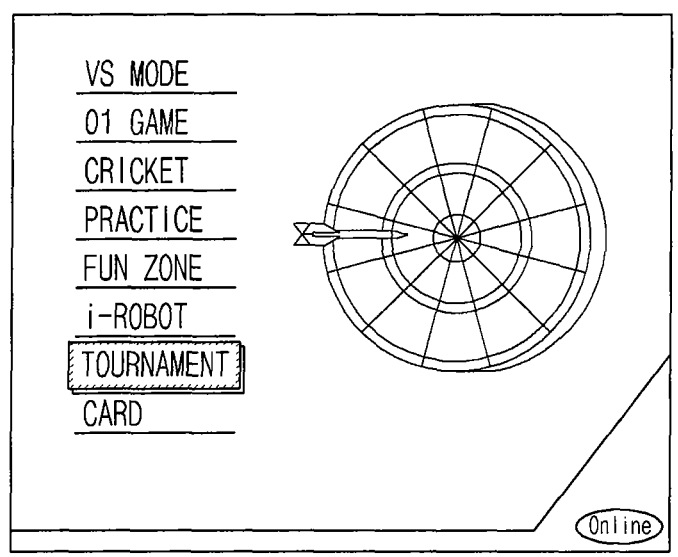
FIGS. 6 to 9 are examples of a menu screen displayed in a display unit of a dart game apparatus according to an embodiment of the present invention.

As shown in FIG. 6, the player selects a competition menu after executing the dart game.

Figure 7:
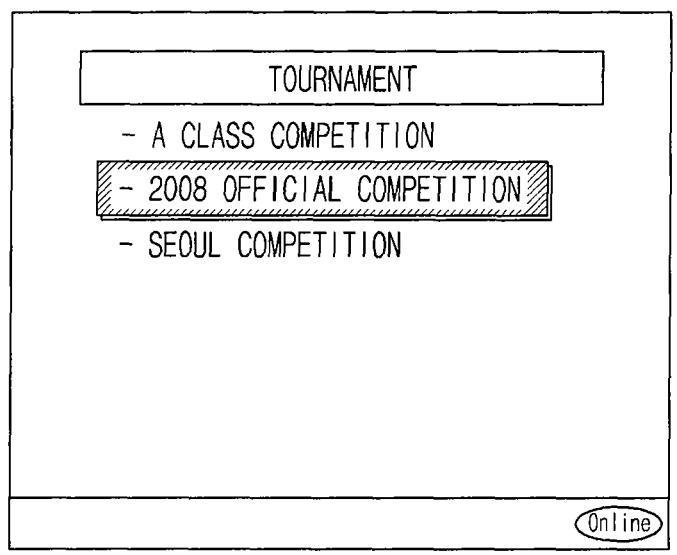

Next, as shown in FIG. 7, lists of currently ongoing competitions are displayed and the player can select a competition in which the player desires to participate from the lists of competitions.

Figure 8:
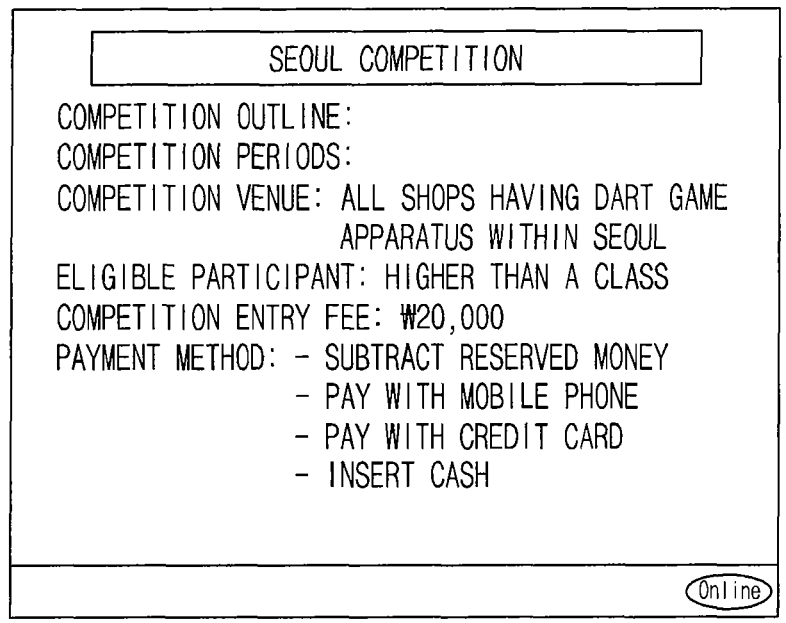

FIG. 8 illustrates information on the selected competition and the user selects a method of paying the competition entry fee from the information.

Figure 9:
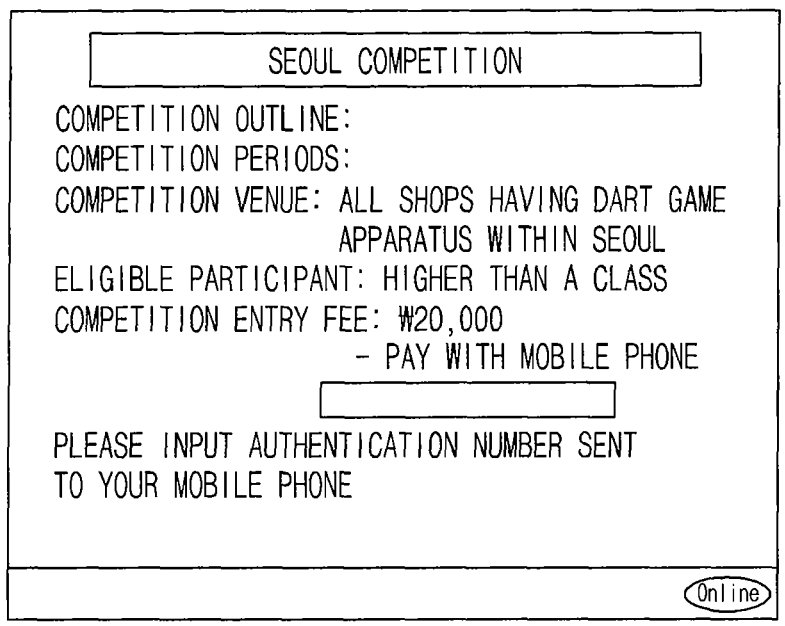

FIG. 9 illustrates a screen in the case where the method of paying the entry fee with the mobile phone is selected and the screen is provided to input an authentication number transmitted to the mobile phone of the player.

So far, the method of controlling the dart game apparatus, which allows the player to directly participate in the competition using the dart game apparatus connected to the network, and the system using the same according to the exemplary embodiment of the present invention have been described.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling a plurality of dart game apparatuses connected with a server through a network, the method comprising:
   inputting information by receiving an input of player information on players who desire to participate in a competition and competition information on a competition in which players desire to participate, by using a dart game apparatus;
   transmitting information including the player information and the competition information to the server by the dart game apparatus;
   processing a payment by registering that a competition entry fee corresponding to the competition information is paid, by the server; and
   registering a player by registering the player information as a player participating in the competition corresponding to the competition information, by the server,
   wherein processing of the payment comprises:
      extracting a portable terminal number corresponding to the player by the server;
      transmitting an authentication number to the extracted portable terminal number by the server;
      inputting an authentication number by receiving an input of the authentication number by the dart game apparatus; and
      comparing authentication numbers by receiving the input authentication number from the dart game apparatus and comparing the received authentication number with the transmitted authentication number by the server.

2. The method as claimed in claim 1, further comprising:
   extracting a competition for participation by extracting a competition in which the player information has been registered as the player, by the server;
   receiving a result of a game played by the player from the dart game apparatus, by the server; and
   storing the received result of the game in association with the extracted competition by the server.

3. The method as claimed in claim 2, further comprising:
   calculating a competition ranking by calculating a ranking for each player for the extracted competition, by the server; and
   transmitting a ranking by transmitting competition ranking information including a ranking corresponding to the player to a portable terminal of the player by using the calculated ranking for each player.

4. The method as claimed in claim 1, wherein processing of the payment comprises:
   calculating reserved money corresponding to the player by the server; and
   subtracting reserved money by subtracting from a competition entry fee the calculated reserved money.

5. The method as claimed in claim 1, wherein processing of the payment comprises:
   inputting cash by receiving an input of cash by the dart game apparatus; and
   transmitting settlement information containing information on the input cash to the server by the dart game apparatus.

6. The method as claimed in claim 1, wherein processing of the payment comprises:
   transmitting credit card information to a payment agency by the server; and
   authenticating a credit card by receiving payment authentication information from the payment agency by the server.

7. The method as claimed in claim 6, wherein the server includes one or more sets of credit card information corresponding to the player and the credit card information corresponds to information extracted from the credit card information corresponding to the input player information from the server.

8. A method of controlling a plurality of dart game apparatuses connected with a server through a network, the method comprising:
   inputting information by receiving an input of player information on players who desire to participate in a competition and competition information on a competition in which players desire to participate, by using a dart game apparatus;
   transmitting information including the player information and the competition information to the server by the dart game apparatus;
   processing a payment by registering that a competition entry fee corresponding to the competition information is paid, by the server;
   registering a player by registering the player information as a player participating in the competition corresponding to the competition information, by the server; and
   checking whether the player is eligible to participate in the competition,
      wherein checking whether the player is eligible to participate in the competition comprises registering the player only when it is checked that the player is eligible to participate in the competition,
      wherein the server includes information on a competition venue corresponding to the competition information and, in checking whether the player is eligible to participate in the competition, the participation is determined by comparing information on a position where the dart game apparatus is installed and information on the competition venue corresponding to the competition information.

9. The method as claimed in claim 8, wherein, in receiving the input of the player information, the player information is fetched by the dart game apparatus through a card having the input player information.

10. A dart game system comprising:
a plurality of dart game apparatuses connected with a server through a network,
wherein each of the dart game apparatuses comprises:
an input unit for receiving an input of player information which is information on players who desire to participate in a competition and competition information which is information on competitions in which players desire to participate;
a target unit comprising a plurality of scoring areas which darts hit;
a sensing unit for detecting the plurality of scoring areas which the darts hit;
a network connector for transmitting the player information and the competition information to the server; and
a controller for controlling such that the competition information and the player information input through the input unit are transmitted through the network connector,
wherein the server comprises:
a payment processor for processing a payment for a competition entry fee corresponding to the competition information; and
a registration unit for registering the player information as a player who participates in the competition corresponding to the competition information,
wherein the payment processor extracts a portable terminal number corresponding to the player from the server, transmits an authentication number to the portable terminal number extracted from the server, receives an authentication number input from the dart game apparatus, and compares the received authentication number with the transmitted authentication number.

11. The dart game system as claimed in claim 10, wherein the server further comprises:
a participation competition extractor for extracting a competition in which the player information has been registered;
a game result receiver for receiving a result of a game played by the player from the dart game apparatus; and
a game result storing unit for storing the received result of the game in association with the extracted competition.

12. The dart game system as claimed in claim 11, wherein the server further comprises:
a competition ranking calculator for calculating a ranking for each player for the extracted competition; and
a short text transmitter for transmitting competition ranking information containing a ranking corresponding to the player to a portable terminal of the player based on the calculated ranking for each player.

13. The dart game system as claimed in claim 10, wherein the payment processor calculates reserved money corresponding to the player from the server and subtracts from the competition entry fee the calculated reserved money.

14. The dart game system as claimed in claim 10, wherein the dart game apparatus further comprises a coin inserter for allowing coins to be inserted or a bill inserter for allowing bills to be inserted, and the payment processor receives settlement information containing information on coins or bills input in the dart game apparatus from the dart game apparatus and stores the received settlement information.

15. The dart game system as claimed in claim 10, wherein the input unit comprises a button unit including top, bottom, left, and right direction keys, an option button, and a selection button, or an RF-ID (Radio Frequency IDentification) card reader.

16. A dart game apparatus comprising:
an input unit for receiving player information and competition information, wherein the player information includes information on a player who will participate in a dart game competition and the competition information includes information on the competition in which the player will participate;
a target unit comprising a plurality of scoring areas which darts hit;
a sensing unit for detecting a area hit by the darts; and
a transmitter for transmitting the player information and the competition information to the server;
wherein the server comprises:
a payment processor which extracts a mobile terminal number corresponding to the player from the server, transmits an authentication number to the mobile terminal corresponding to the extracted mobile terminal number, receives an authentication number received from a dart game apparatus, and compares the received authentication number with the transmitted authentication number.

17. A method comprising:
receiving a player information and a competition information, wherein the player information includes the information on players who will participate in a dart game competition and competition information includes the information on the dart game competition in which the players will participate;
transmitting the player information and the competition information to a server; and
processing a payment by confirming that a competition entry fee corresponding to the competition is paid,
wherein the processing the payment comprises the step of:
transmitting an authentication number inputted by a user of a client device to the server,
and wherein the authentication number inputted by the user is compared with an authentication number which was transmitted by the server to a mobile terminal;
and wherein the mobile terminal has a mobile terminal number extracted by the server and the mobile terminal number corresponds to the player information,
and wherein the client device and the mobile terminal are different from each other.

18. A method performed by a server communicating with a plurality of dart game apparatuses, comprising:
receiving a player information and a competition information, wherein the player information includes the information on player who will participate in a dart game competition and competition information includes the information on the dart game competition in which the players will participate;
processing a payment by confirming that a competition entry fee corresponding to the competition is paid; and
registering the player by registering the player information as a player participating in the dart game competition;
wherein the processing a payment comprises,
extracting a mobile terminal number corresponding to the player;
transmitting a first authentication number to a mobile terminal corresponding to the extracted mobile terminal number;
receiving, from one of the plurality of dart game apparatuses, a second authentication number;

comparing the first authentication number with the second authentication number,
and wherein the one of the plurality of dart game apparatuses and the mobile terminal are different from each other.

* * * * *